US008022875B2

(12) United States Patent
Huang et al.

(10) Patent No.: US 8,022,875 B2
(45) Date of Patent: Sep. 20, 2011

(54) INDOOR LOCALIZATION SYSTEM AND METHOD

(75) Inventors: Polly Huang, Taipei (TW); Tsung-Han Lin, Taipei (TW); I-Hei Ng, Tainan County (TW)

(73) Assignee: National Taiwan University (TW)

( * ) Notice: Subject to any disclaimer, the term of this patent is extended or adjusted under 35 U.S.C. 154(b) by 214 days.

(21) Appl. No.: 12/472,073

(22) Filed: May 26, 2009

(65) Prior Publication Data

US 2010/0127935 A1    May 27, 2010

(30) Foreign Application Priority Data

Nov. 25, 2008   (TW) ................................ 97145521 A

(51) Int. Cl.
   *G01S 3/02*   (2006.01)
(52) U.S. Cl. ..................... 342/451; 342/463; 342/464
(58) Field of Classification Search .................. 342/451, 342/463, 464
   See application file for complete search history.

(56) References Cited

U.S. PATENT DOCUMENTS

2004/0061646 A1*  4/2004  Andrews et al. ............. 342/463
2005/0243936 A1* 11/2005  Agrawala et al. ............ 375/259
2007/0061245 A1*  3/2007  Ramer et al. .................. 705/37
2011/0004072 A1*  1/2011  Fletcher et al. .............. 600/300

OTHER PUBLICATIONS

Wikipedia, "Universal Serial Bus", created 2001, http://en.wikipedia.org/wiki/Universal_Serial_Bus.*

* cited by examiner

*Primary Examiner* — Thomas Tarcza
*Assistant Examiner* — Frank McGue
(74) *Attorney, Agent, or Firm* — Baker & McKenzie LLP

(57) ABSTRACT

An indoor localization method is implemented using an indoor localization system that includes beacons deployed in an indoor space and transmitting localization signals, and a radio badge for receiving the localization signals. The indoor localization method includes forming signal vectors from the localization signals received by the radio badge at each of predetermined locations in the indoor space, and generating a signal ID value from the signal vectors for each beacon from which the radio badge has received the localization signals. During a tracking phase, signal vectors are formed from the localization signals received by the radio badge at a current location. If the number of the signal ID values is smaller than the number of the signal vectors, the sum of the signal distances is normalized by the number of the signal ID values. An estimated position of the radio badge is obtained using the signal vectors and the signal ID values.

20 Claims, 3 Drawing Sheets

INDOOR LOCALIZATION SYSTEM AND METHOD

CROSS-REFERENCE TO RELATED APPLICATION

This application claims priority of Taiwanese Application No. 097145521, filed on Nov. 25, 2008.

BACKGROUND OF THE INVENTION

1. Field of the Invention

The present invention relates to an indoor localization system and method, more particularly to an indoor localization system and method using a normalized k-nearest-neighbor algorithm.

2. Description of the Related Art

The market for real-time localization systems for assets and personnel tracking has grown considerably over the years and is expected to continue to grow. For widespread adoption and everyday use of real-time localization systems in households and commercial buildings, the systems must be able to provide accurate and stable location estimations with little delay.

In addition to widely used outdoor localization systems, applications developed for indoor settings are becoming increasingly important. Most indoor localization systems employ a Radio Signal Strength Indicator (RSSI)-signature-based approach. The RSSI-signature-based approach is used to detect the received strengths of wireless signals transmitted from a plurality of beacons that are deployed in various fixed locations. The strengths of the signals received by a radio badge or tag are then used to estimate the indoor location of a tracked target.

However, due to adverse factors that affect the stability of signal reception, such as background signal noise interference during the localization process, the indoor location, topological changes, etc., conventional indoor localization systems often generate very large localization errors. This results in poor accuracy.

Therefore, there is a need for an indoor localization system and method that provide enhanced localization accuracy, even when such adverse factors that affect the stability of signal reception are present.

SUMMARY OF THE INVENTION

Therefore, the object of the present invention is to provide an indoor localization system and method using a normalized k-nearest-neighbor algorithm.

According to one aspect of this invention, an indoor localization system comprises: a plurality of beacons deployed in an indoor space and each periodically transmitting a localization signal; a radio badge carried by a tracked target moving in the indoor space for receiving the localization signals from a variable number of the beacons dependent on a current location of the tracked target in the indoor space; and a host communicatively coupled to the beacons and the radio badge.

One of the radio badge and the host performs at least one step of an indoor localization method of this invention, and the other of the radio badge and the host performs the remaining steps of the indoor localization method of this invention.

According to another aspect, the indoor localization method of this invention comprises: during a training phase, forming a plurality of signal vectors respectively from the localization signals received by the radio badge at each of predetermined locations in the indoor space, and generating a signal ID value from the signal vectors for each of the beacons from which the radio badge has received the localization signals; during a tracking phase, again forming a plurality of signal vectors respectively from the localization signals received by the radio badge at the current location in the indoor space; if the number of the signal ID values generated in the training phase and corresponding to one of the predetermined locations is smaller than the number of the signal vectors formed in the tracking phase and corresponding to the current location, supplementing each deficient signal ID value corresponding to the one of the predetermined locations using a predetermined value; and calculating a plurality of distances between the signal vectors formed during the tracking phase and corresponding to the current location and the signal ID values corresponding to the predetermined locations, acquiring reference values by dividing a sum of said distances by the number of the signal vectors formed during the tracking phase, acquiring a plurality of target values from a subset of the reference values including a predetermined number of the smallest reference values, and obtaining an estimated position of the radio badge by weighted average processing using the target values.

If the number of the signal vectors formed in the tracking phase and corresponding to the current location is smaller than the number of the signal ID values generated in the training phase and corresponding to the one of the predetermined locations, supplementing of each deficient signal vector corresponding to the current location is not conducted.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
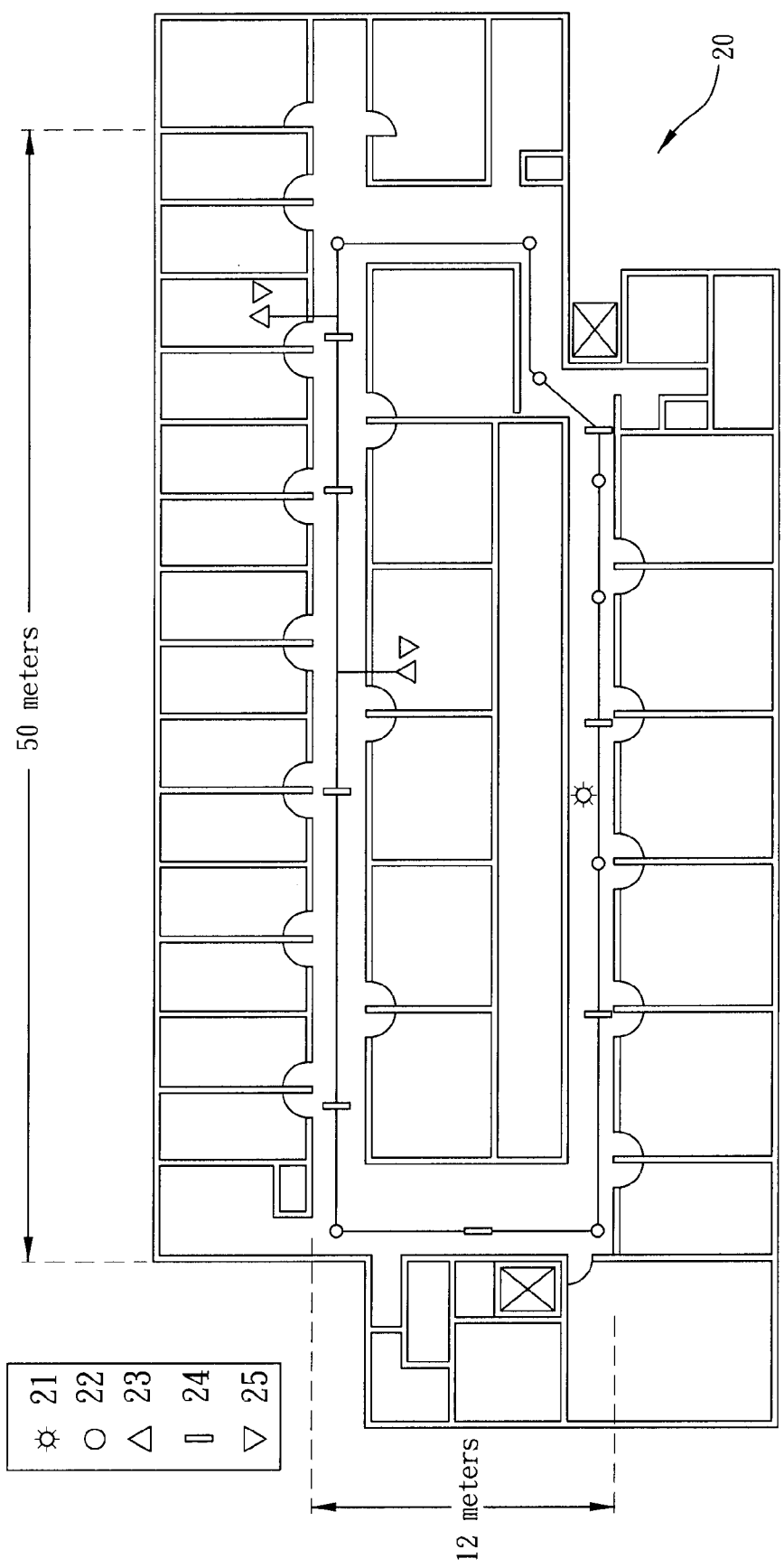
FIG. 1 is a schematic diagram of an indoor localization system according to a preferred embodiment of the present invention, illustrating the indoor localization system in a layout used to perform a field test in an indoor space.

FIG. 1 is a schematic diagram of an indoor localization system according to a preferred embodiment of the present invention. In FIG. 1, the indoor localization system is provided in an exemplary layout in an indoor space 20 for purposes of performing an actual field test.

In one embodiment, the indoor localization system of the present invention includes a radio badge 21, a plurality of beacons 22, two hosts 23, a plurality of universal serial bus (USB) hubs 24, and two power supplies 25. The USB hubs 24 and the power supplies 25 will be described at a later point in the description, that is, during the explanation of the field test. Furthermore, for the explanation to follow immediately below, it is assumed that there is only one host 23.

The beacons 22 are deployed in the indoor space 20. Each of the beacons 22 periodically transmits a localization signal. In one embodiment, each of the localization signals transmitted by each of the beacons 22 is a short packet containing an ID of the beacon 22. Moreover, in one embodiment, the beacons 22 transmit the localization signals utilizing an asynchronous protocol, so that neighboring beacons 22 have different transmission times to avoid signal collisions.

The radio badge 21 is carried by a tracked target moving in the indoor space 20. The radio badge 21 receives the localization signals from a variable number of the beacons 22 dependent on a current location of the tracked target in the indoor space 20.

The host 23 is communicatively coupled to the beacons 22 and the radio badge 21.

Figure 2:
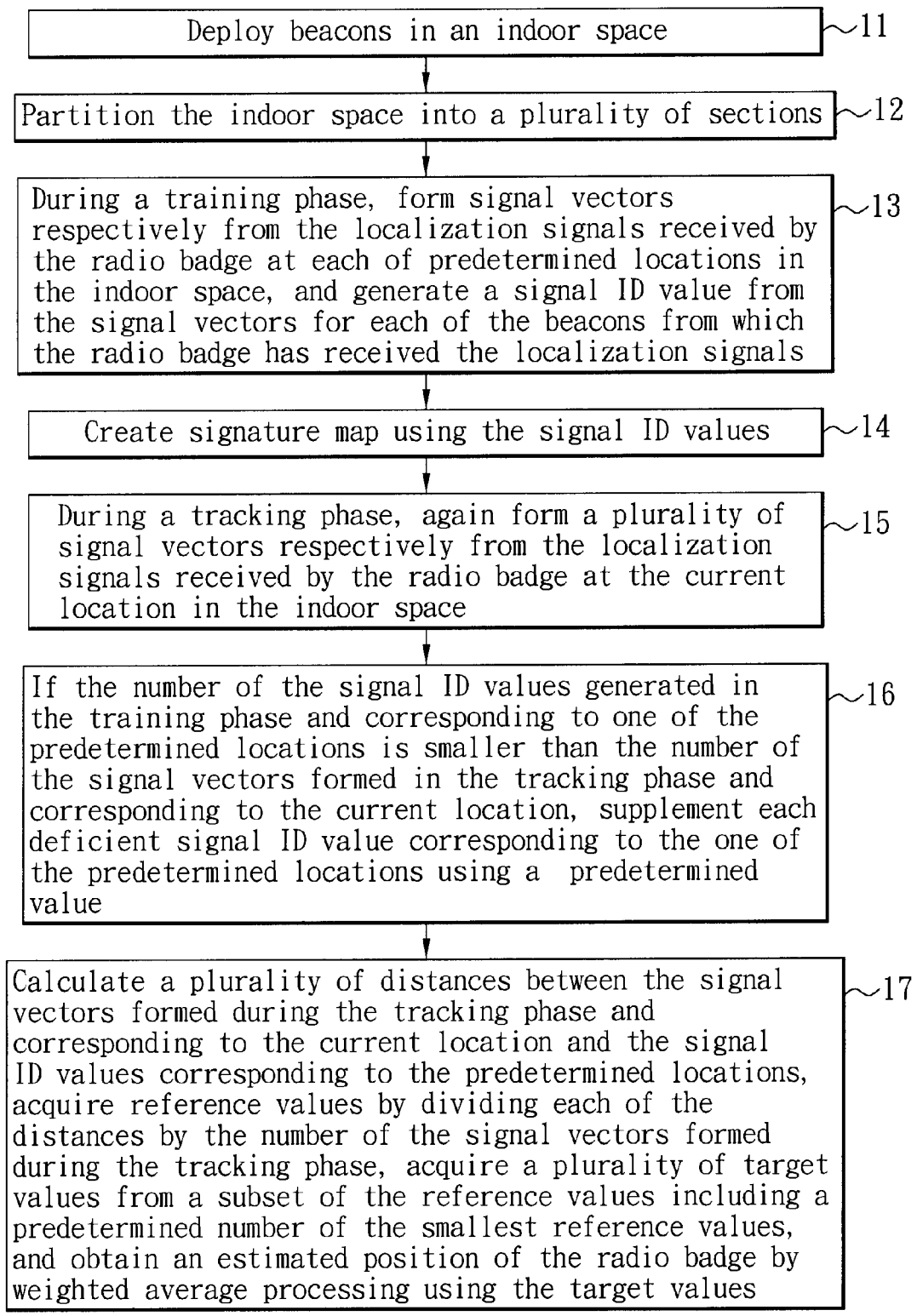
FIG. 2 is a flowchart of an indoor localization method according to a preferred embodiment of the present invention.

One of the radio badge 21 and the host 23 performs at least one step of an indoor localization method according to a preferred embodiment of the present invention, and the other of the radio badge 21 and the host 23 performs the remaining steps of the indoor localization method. The indoor localization method of the present invention will now be described with further reference to FIG. 2.

First, in step 11, the beacons 22 are deployed in the indoor space 20.

Next, in step 12, the indoor space 20 is partitioned into a plurality of sections. In one embodiment, the sections of the indoor space 20 are partitioned in a grid configuration, and each of the sections is rectangular and extends for approximately 30 cm in a lengthwise direction. This particular dimension of 30 cm for the sections of the indoor space 20 is chosen since it corresponds roughly to the typical walking stride length.

Subsequently, in step 13, during a training phase, a plurality of signal vectors are formed respectively from the localization signals received by the radio badge 21 at each of predetermined locations (i.e., the partitioned sections) in the indoor space 20, and a signal ID value is generated from the signal vectors for each of the beacons 22 from which the radio badge 21 has received the localization signals.

In one embodiment, in step 13, the signal ID value for each of the beacons 22 from which the radio badge 21 has received the localization signals is generated by averaging the signal vectors that are formed from the localization signals received at one of the predetermined locations from a corresponding one of the beacons 22 during the training phase.

Next, in step 14, the signal ID values generated in step 13 are used to create a signature map of the indoor space 20.

Subsequently, in step 15, during a tracking phase, a plurality of signal vectors are again formed respectively from the localization signals received by the radio badge 21 at the current location in the indoor space 20.

In one embodiment, each of the beacons 22 periodically transmits a localization signal at a predetermined signal-sending interval. In such an embodiment, in step 13, the training phase extends for a predetermined number of units of the signal-sending interval, and in step 15, the tracking phase extends for at least one but less than two units of the signal-sending interval.

In one embodiment, the signal-sending interval at which each of the beacons 22 periodically transmits a localization signal is 200 ms. In this case, in step 13, the training phase extends for 40 units of the signal-sending interval (for a total of 8 seconds), such that each of the signal ID values is formed from 40 of the signal vectors, and in step 15, the tracking phase extends for approximately 220 ms.

Next, in step 16, if the number of the signal ID values generated in the training phase and corresponding to one of the predetermined locations is smaller than the number of the signal vectors formed in the tracking phase and corresponding to the current location, each deficient signal ID value corresponding to the one of the predetermined locations is supplemented using a predetermined value.

However, if it is the signal vectors that are deficient, that is, if the number of the signal vectors formed in the tracking phase and corresponding to the current location is smaller than the number of the signal ID values generated in the training phase and corresponding to the one of the predetermined locations, supplementing of each deficient signal vector corresponding to the current location is not conducted.

Finally, in step 17, a plurality of distances between the signal vectors formed during the tracking phase and corresponding to the current location and the signal ID values corresponding to the predetermined locations are calculated, reference values are acquired by dividing a sum of said distances by the number of the signal vectors formed during the tracking phase, a plurality of target values are acquired from a subset of the reference values including a predetermined number of the smallest reference values, and an estimated position of the radio badge 21 is obtained by weighted average processing using the target values.

In one embodiment, each of the distances calculated in step 17 is a Euclidean distance. In another embodiment, each of the distances calculated in step 17 is a Manhattan distance.

A field test was performed to verify the feasibility of the indoor localization system implementing the indoor localization method according to the present invention. The layout shown in FIG. 1 was used for the field test, in which the indoor space 20 was on a floor of a building that included a plurality of small rooms, and the beacons 22 were deployed in a hallway between the rooms.

Furthermore, to allow for easy monitoring of the field test and allow for quick response once a problem occurs, each of the beacons 22 was connected to one of two hosts 23 via one of the USB hubs 24. An equal number of the beacons 22 was connected to each host 23. The two hosts 23 acted like gateways to allow for easy program upgrades and updating. The power supplies 25 were used for the beacons 22 and the hosts 23 to provide a continuous source of power thereto, thereby avoiding the inconvenience of having to replace batteries.

Figure 3:
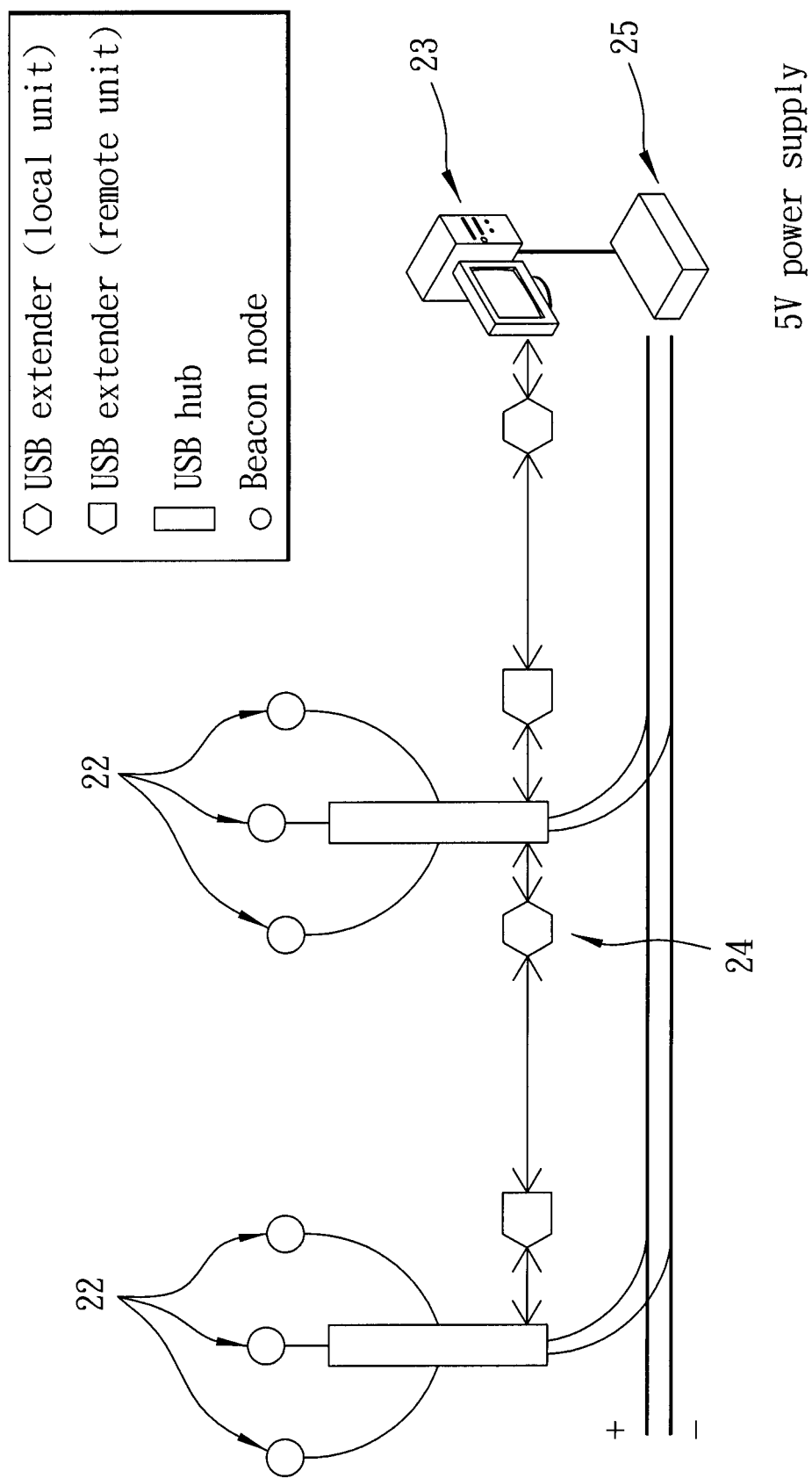
FIG. 3 is a schematic diagram, illustrating a chaining scheme used to connect adjacent beacons in the indoor localization system of the preferred embodiment.

The USB hubs 24 used in the field test included USB extenders to enable greater transmission lengths, that is, to overcome the transmission limitation of 5 meters for typical USB hubs. USB extenders enable a transmission length of 45 meters or greater, which, as is evident from FIG. 1, was needed for the field test. Moreover, in order to avoid redundant wiring in the indoor space 20, a chaining scheme as shown in FIG. 3 was used to connect adjacent beacons 22.

During the field test, the radio badge 21 received signals from an average of ten of the beacons 22.

From the results of the field test, it was determined that effective indoor localization is realized using the indoor localization system and method according to this invention.

In the indoor localization system and method of the present invention as described above, if the number of the signal ID values generated in the training phase and corresponding to one of the predetermined locations is smaller than the number of the signal vectors formed in the tracking phase and corresponding to the current location, each deficient signal ID value corresponding to the one of the predetermined locations is supplemented using a predetermined value. Furthermore, if the number of the signal vectors formed in the tracking phase and corresponding to the current location is smaller than the number of the signal ID values generated in the training phase and corresponding to the one of the predetermined locations, supplementing each deficient signal vector corresponding to the current location is not conducted. If deficient signal vectors also were supplemented, this would introduce bias into the calculations performed to estimate position. Moreover, this actual number of the signal vectors is used for division to obtain the reference values, which, in turn, are used for obtaining an estimated position of the radio badge 21. Hence, the present invention utilizes a normalized k-nearest-neighbor (NKNN) algorithm.

In the present invention, the signal vectors formed in the tracking phase and corresponding to the current location, that is, the signal vectors formed from localization signals actually received by the radio badge 21, are reflected in the calculations performed to estimate position, and hence, localization accuracy is enhanced.

With the invention thus explained, it is apparent that various modifications and variations can be made without departing from the spirit of the present invention. It is therefore intended that the invention be limited only as recited in the appended claims.

What is claimed is:

1. An indoor localization method to be implemented using an indoor localization system that includes a plurality of beacons deployed in an indoor space and each periodically transmitting a localization signal, and a radio badge carried by a tracked target moving in the indoor space for receiving the localization signals from a variable number of the beacons dependent on a current location of the tracked target in the indoor space, said indoor localization method comprising:
(a) during a training phase, forming a plurality of signal vectors respectively from the localization signals received by the radio badge at each of predetermined locations in the indoor space, and generating a signal ID value from the signal vectors for each of the beacons from which the radio badge has received the localization signals;
(b) during a tracking phase, again forming a plurality of signal vectors respectively from the localization signals received by the radio badge at the current location in the indoor space;
(c) if the number of the signal ID values generated in the training phase and corresponding to one of the predetermined locations is smaller than the number of the signal vectors formed in the tracking phase and corresponding to the current location, supplementing each deficient signal ID value corresponding to said one of the predetermined locations using a predetermined value; and
(d) calculating a plurality of distances between the signal vectors formed during the tracking phase and corresponding to the current location and the signal ID values corresponding to the predetermined locations, acquiring reference values by dividing a sum of said distances by the number of the signal vectors formed during the tracking phase, acquiring a plurality of target values from a subset of the reference values including a predetermined number of the smallest reference values, and obtaining an estimated position of the radio badge by weighted average processing using the target values;
wherein, in step (c), if the number of the signal vectors formed in the tracking phase and corresponding to the current location is smaller than the number of the signal ID values generated in the training phase and corresponding to said one of the predetermined locations, supplementing of each deficient signal vector corresponding to the current location is not conducted.

2. The indoor localization method of claim 1, wherein the indoor space is partitioned into a plurality of sections that serve as the predetermined locations, respectively.

3. The indoor localization method of claim 2, wherein the sections of the indoor space are partitioned in a grid configuration.

4. The indoor localization method of claim 3, wherein each of the sections is rectangular and extends for approximately 30 cm in a lengthwise direction.

5. The indoor localization method of claim 1, wherein, in step (a), the signal ID value for each of the beacons from which the radio badge has received the localization signals is generated by averaging the signal vectors that are formed from the localization signals received at one of the predetermined locations from a corresponding one of the beacons during the training phase.

6. The indoor localization method of claim 1, each of the beacons periodically transmitting a localization signal at a predetermined signal-sending interval of 200 ms, wherein, in step (a), the training phase extends for 40 units of the signal-sending interval, such that each of the signal ID values is formed from 40 of the signal vectors.

7. The indoor localization method of claim 6, wherein, in step (b), the tracking phase extends for approximately 220 ms.

8. The indoor localization method of claim 1, each of the beacons periodically transmitting a localization signal at a predetermined signal-sending interval, wherein, in step (a), the training phase extends for a predetermined number of units of the signal-sending interval, and, in step (b), the tracking phase extends for at least one but less than two units of the signal-sending interval.

9. The indoor localization method of claim 1, wherein, in step (d), each of the distances is a Euclidean distance.

10. An indoor localization system for performing localization in an indoor space, said indoor localization system comprising:
a plurality of beacons deployed in the indoor space and each periodically transmitting a localization signal;
a radio badge carried by a tracked target moving in the indoor space for receiving the localization signals from a variable number of said beacons dependent on a current location of the tracked target in the indoor space; and
a host communicatively coupled to said beacons and said radio badge;
wherein one of said radio badge and said host performs at least one step of an indoor localization method, and the other of said radio badge and said host performs the remaining steps of the indoor localization method, the indoor localization method including:
(a) during a training phase, forming a plurality of signal vectors respectively from the localization signals received by said radio badge at each of predetermined locations in the indoor space, and generating a signal ID value from the signal vectors for each of said beacons from which said radio badge has received the localization signals;
(b) during a tracking phase, again forming a plurality of signal vectors respectively from the localization signals received by said radio badge at the current location in the indoor space;
(c) if the number of the signal ID values generated in the training phase and corresponding to one of the predetermined locations is smaller than the number of the signal vectors formed in the tracking phase and corresponding to the current location, supplementing each deficient signal ID value corresponding to said one of the predetermined locations using a predetermined value; and
(d) calculating a plurality of distances between the signal vectors formed during the tracking phase and corresponding to the current location and the signal ID values corresponding to the predetermined locations, acquiring reference values by dividing a sum of said distances by the number of the signal vectors formed during the tracking phase, acquiring a plurality of target values from a subset of the reference values including a predetermined number of the smallest reference values, and obtaining an estimated position of said radio badge by weighted average processing using the target values;

wherein, in step (c), if the number of the signal vectors formed in the tracking phase and corresponding to the current location is smaller than the number of the signal ID values generated in the training phase and corresponding to said one of the predetermined locations, supplementing each deficient signal vector corresponding to the current location is not conducted.

11. The indoor localization system of claim 10, wherein the indoor space is partitioned into a plurality of sections that serve as the predetermined locations, respectively.

12. The indoor localization system of claim 11, wherein the sections of the indoor space are partitioned in a grid configuration.

13. The indoor localization system of claim 12, wherein each of the sections is rectangular and extends for approximately 30 cm in a lengthwise direction.

14. The indoor localization system of claim 10, wherein, in step (a), the signal ID value for each of said beacons from which said radio badge has received the localization signals is generated by averaging the signal vectors that are formed from the localization signals received at one of the predetermined locations from a corresponding one of said beacons during the training phase.

15. The indoor localization system of claim 10, wherein each of said beacons periodically transmits a localization signal at a predetermined signal-sending interval of 200 ms, and in step (a), the training phase extends for 40 units of the signal-sending interval, such that each of the signal ID values is formed from 40 of the signal vectors.

16. The indoor localization system of claim 15, wherein, in step (b), the tracking phase extends for approximately 220 ms.

17. The indoor localization system of claim 10, wherein each of said beacons periodically transmits a localization signal at a predetermined signal-sending interval,
in step (a), the training phase extends for a predetermined number of units of the signal-sending interval, and
in step (b), the tracking phase extends for at least one but less than two units of the signal-sending interval.

18. The indoor localization system of claim 10, wherein, in step (d), each of the distances is a Euclidean distance.

19. The indoor localization system of claim 10, wherein each of the localization signals transmitted by each of said beacons is a short packet containing an ID of said beacon.

20. The indoor localization system of claim 10, further comprising a universal serial bus hub and a universal serial bus extender for interconnecting said beacons and said host.

* * * * *